United States Patent [19]

Marx et al.

[11] 4,304,708
[45] Dec. 8, 1981

[54] PROCESS FOR THE MANUFACTURE OF STABLE POLYOL-FILLER DISPERSIONS

[75] Inventors: Matthias Marx, Bad Durkheim; Dietmar Nissen, Heidelberg, both of Fed. Rep. of Germany

[73] Assignee: BASF Aktiengesellschaft, Ludwigshafen, Fed. Rep. of Germany

[21] Appl. No.: 228,928

[22] Filed: Jan. 27, 1981

Related U.S. Application Data

[63] Continuation-in-part of Ser. No. 93,938, Nov. 13, 1979, abandoned.

[30] Foreign Application Priority Data

Nov. 22, 1978 [DE] Fed. Rep. of Germany ....... 2850609

[51] Int. Cl.³ .............................................. C08L 71/00
[52] U.S. Cl. .................................. 260/37 R; 252/182; 260/34.2; 260/37 N; 260/40 R; 260/42.54; 521/116; 521/120; 521/122

[58] Field of Search ................. 260/37 N, 37 R, 34.2, 260/42.54, 40 R; 521/116, 120, 122; 252/182; 241/15

[56] References Cited

U.S. PATENT DOCUMENTS

| 3,257,351 | 6/1966 | Kraus et al. | 260/34.2 |
| 4,067,831 | 1/1978 | Wasilczyk | 521/122 |
| 4,104,229 | 8/1978 | Sekmakas et al. | 260/42.54 |
| 4,108,791 | 8/1978 | Wasilczyk | 521/122 |
| 4,207,227 | 6/1980 | Bonin et al. | 260/37 R |
| 4,235,765 | 11/1980 | Gallagher et al. | 260/37 N |
| 4,240,950 | 12/1980 | Bonin et al. | 260/37 N |
| 4,243,755 | 1/1981 | Marz et al. | 252/182 |
| 4,250,077 | 2/1981 | Bonin et al. | 260/37 N |

FOREIGN PATENT DOCUMENTS 50-30931 3/1975 Japan ............................... 260/42.54

Primary Examiner—Lewis T. Jacobs
Attorney, Agent, or Firm—Norbert M. Lisicki

[57] ABSTRACT

This invention relates to a process for the manufacture of stable polyol-filler dispersions. The polyol-filler dispersions are prepared by the crushing of fillers in situ in polyols employing high localized energies.

5 Claims, 3 Drawing Figures

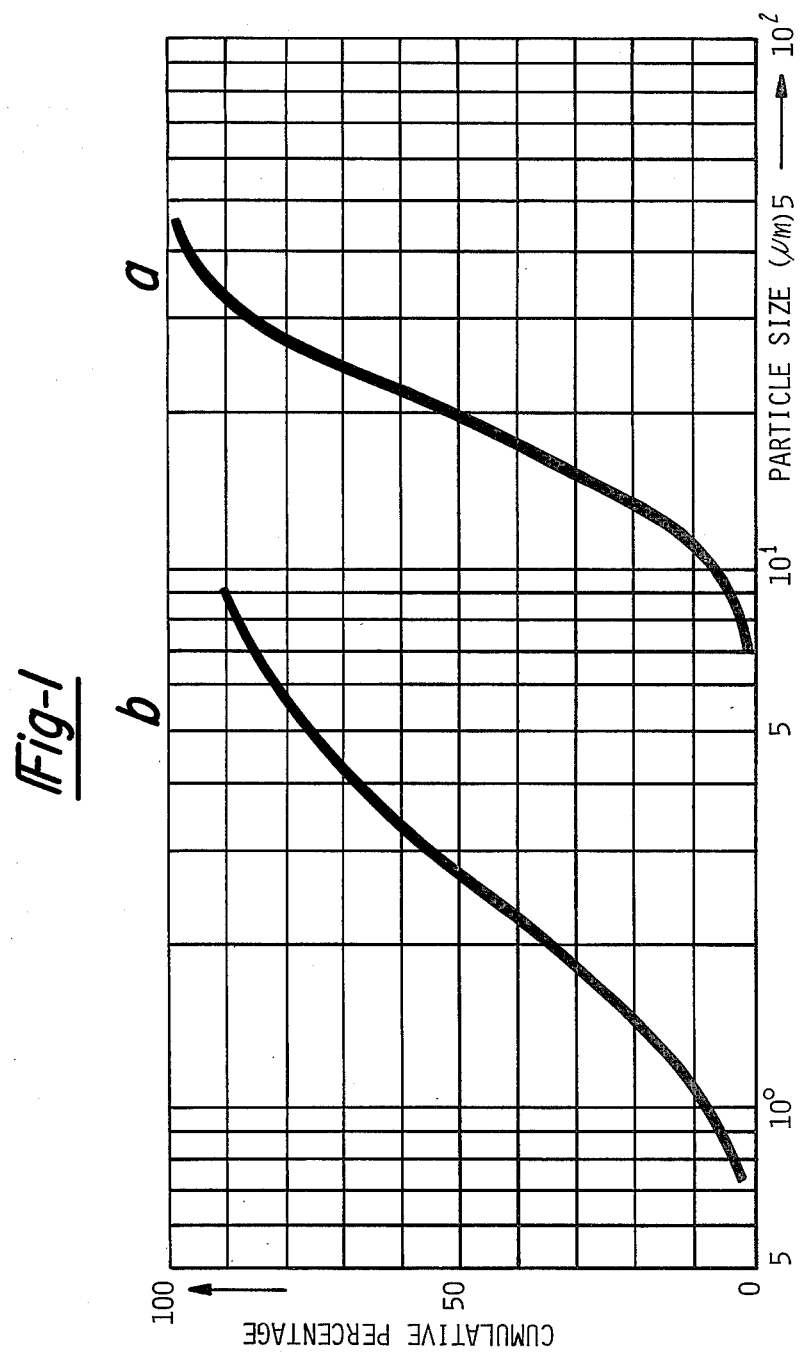

PROCESS FOR THE MANUFACTURE OF STABLE POLYOL-FILLER DISPERSIONS

This application is a continuation-in-part of application Ser. No. 93,938, filed Nov. 13, 1979, now abandoned.

BACKGROUND OF THE INVENTION

1. Field of the Invention

The invention relates to a process for the manufacture of stable polyol-filler dispersions. More particularly, this invention relates to polyol-filler dispersions wherein fillers, preferably inorganic fillers, are crushed to particle sizes or less than 7 microns employing high localized energies in situ with polyols.

2. Prior Art

The manufacture of dispersions of fillers in organic polymers and hydroxyl group containing polyethers is known. For this purpose, aqueous polymer dispersions are generally mixed with polyethers and the water is subsequently removed. It was also suggested to produce graft polymers by in situ polymerization of ethylenically unsaturated monomers in possibly ethylenically unsaturated polyethers and to use the obtained product for the manufacture of polyurethanes.

If inorganic fillers are used for the manufacture of polyurethanes, these are normally incorporated in the polyols immediately prior to processing. It has also been attempted to disperse inorganic materials in polyethers. In most cases, such dispersions have very high viscosities which make processing considerably more difficult or even impossible. Another advantage is that the inorganic fillers, due to their higher specific weight, will sediment more quickly than organic polymers.

The purpose of this invention was the manufacture of storage-stable, non-sedimenting dispersions of fillers in polyols which, with a solids content of 10 percent by weight based on the total weight, have a viscosity of less than 2500 centipoises at 25° C. and with solids contents of 20 percent by weight, have viscosities of less than 5000 centipoises at 25° C.

It was found that storage-stable dispersions with the desired properties are obtained if the filler materials are crushed in situ in the polyols.

The object of this invention is therefore a process for the manufacture of stable filler polyol dispersions wherein the fillers are crushed with high localized energy densities to a particle size of less than 7 microns in situ in the polyols with the result that the filler particles are comminuted and thus simultaneously dispersed to form a stable dispersion.

BRIEF DESCRIPTION OF THE DRAWINGS

FIG. 1 is a plot of the particle size of melamine powder in a polyether polyol (a) before and (b) after dispersion employing a bead mill.

DESCRIPTION OF THE PREFERRED EMBODIMENT

Figure 2A:
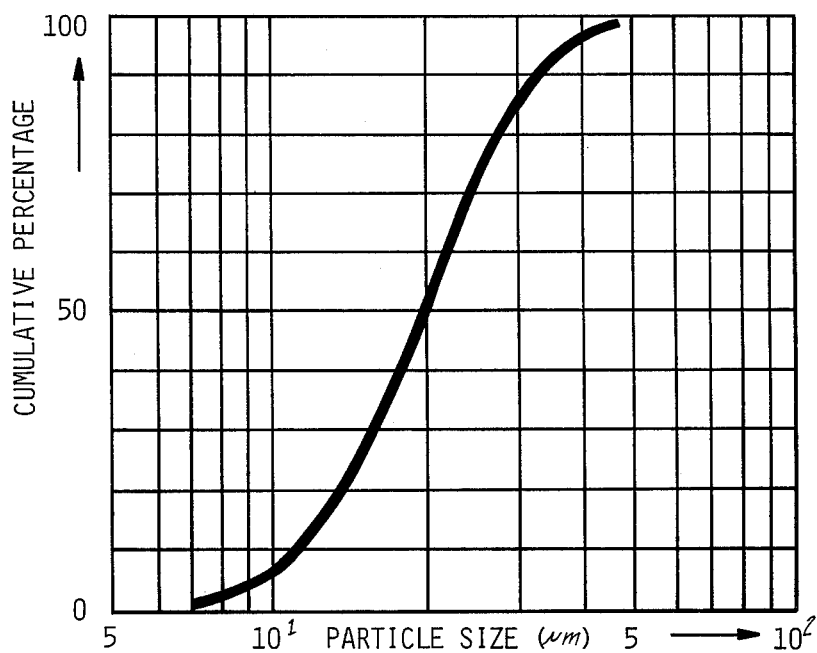
FIG. 2 is a plot of the particle size of melamine powder in a polyether polyol (a) before and (b) after dispersion employing a dissolver.

The fillers and/or pigments are initially crushed to particle sizes smaller than 100 microns. For this purpose, coarsely grained materials may, for instance, be ground by mechanical mills such as impact disc mills, pinned disc mills, and others. However, it is also possible to obtain particle sizes smaller than 100 microns by other methods, for instance, by reprecipitation.

The fillers and/or pigments pretreated in the above described manner in the presence of polyols and possibly dispersing agents are now crushed in situ to particle sizes smaller than 7 microns (wet crushing).

The wet crushing may, for instance, be carried out in mechanical dispersing devices, preferably in dispersing machines having high local energy density with grinding facility such as ball mills, sand mills, netsch mills, bead mills, dyno mills, planetary ball mills, tube mills and attrition mills. Used on a preferable basis are spherical grinding material which, for instance, may be made of glass, ceramic, metal, or rigid abrasion resistant plastics such as polyamide. The diameter of these spheres should be 0.2 to 8, preferably 0.4 to 5 millimeters.

For the purpose of wet crushing, the filler is mixed with the polyol in such quantities that the resulting dispersion has a filler content of 3 to 50 percent by weight, preferably of 3 to 25 percent by weight, based on the overall weight.

The total amount of filler can be mixed with the total amount of polyol and possible dispersing auxiliaries and thus can be crushed and simultaneously dispersed. However, it is also possible to mix the entire amount of polyol with a certain part of the filler and to crush this mixture to a certain particle size of the filler and to then incorporate the remaining amount of filler in this mixture or preferably to grind a partial amount of polyol with the total amount of filler in the presence of dispersing auxiliaries and to add additional polyol and possibly dispersing auxiliaries during the further course of the grinding process.

The products are preferably used for the manufacture of polyurethanes and, in particular, polyurethane foams.

By means of the process according to this invention, polyol-filler dispersions are produced which contain 3 to 50 percent by weight, preferably 3 to 25 percent by weight, based on the total weight of polyol. The particle size of the organic and inorganic filler is 0.01 to 7 microns, preferably 0.05 to 1.5 microns. With a solids content of 10 percent by weight, the viscosities of the dispersions are less than 2500 centipoise, preferably 1000 to 1500 centipoise, at 25° C. and with a solids content of 20 percent by weight, the viscosities are less than 5000 centipoise, preferably 1500 to 4000 centipoise, at 25° C. and are therefore very well suited for processing on commonly used machinery for the manufacture of polyurethanes.

Another advantage is that the filler polyol dispersions produced in accordance with this invention have an extraordinarily good storage stability. After storage periods of more than 6 months, no precipitation of solid material could be discerned.

DETAILED DESCRIPTION OF THE DRAWINGS

In FIG. 1 is shown the cumultative percentage of particles ranging over a particle size range (a) before and (b) after dispersion in a bead mill employing a local energy density of 670 kilowatt hours per cubic meter. This dispersion containing 25 percent by weight melamine was storage stable displaying no sedimentation for several months.

Figure 2B:
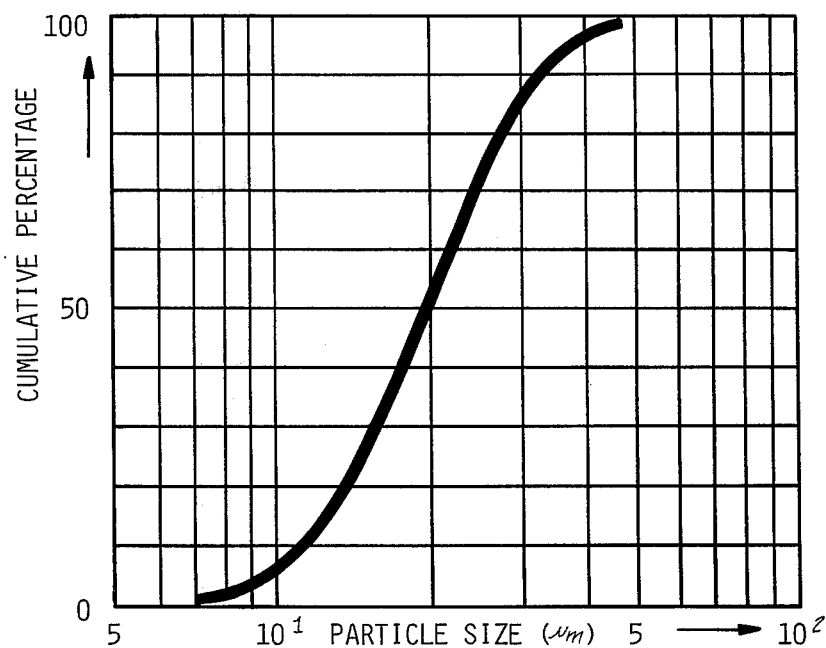

In FIG. 2 is shown the cumulative percentage of particles ranging over a particle size range (a) beofore and (b) after dispersion in a dissolver employing a local energy density of 15 to 20 kilowatt hours per cubic meter. This dispersion containing 25 percent by weight melamine displayed sedimentation within 24 hours forming a clear supernatant layer.

Suitable polyols which are useful as dispersing media have functionalities of 2 to 8, preferably 2 to 4, and molecular weights of 200 to 8000, preferably 800 to 6000, and in particular 1800 to 3000. Well proven and therefore preferably used are polyesters and, in particular, polyethers. However, other hydroxyl group-containing polymers with the above disclosed molecular weights, for instance, polyester amides, polyoxymethylene and polycarbonates, in particular those manufactured from diphenylcarbonates and 1,6-hexanediol by transesterification may also be employed.

The polyesters may be prepared, for example, by reacting dicarboxylic acids, preferably aliphatic dicarboxylic acids having 2 to 12, preferably 4 to 8, carbon atoms in the alkylene radical with multifunctional alcohols, preferably diols. Examples of the acids include aliphatic dicarboxylic acids such as glutaric acid, pimelic acid, suberic acid, azelaic acid, sebacic acid, undecanedioic acid, dodecanedioic acid, and preferably succinic and adipic acid, and aromatic dicarboxylic acids such as phthalic acid and terephthalic acid. Examples of bi- and multifunctional, particularly trifunctional alcohols are: ethylene glycol, diethylene glycol, propylene glycol, trimethylene glycol, dipropylene glycol, 1,10-decanediol, glycerine, trimethylolpropane, and preferably 1,4-butanediol and 1,6-hexanediol.

The polyesters may have molecular weights of 800 to 3500, preferably 1500 to 2800, and hydroxyl numbers of 35 to 180, preferably 40 to 110.

Most preferably used as polyols are polyethers which are produced according to well-known processes from the reaction of one or several alkylene oxides having 2 to 4 carbon atoms in the alkylene radical and a starter molecule which contains 2 to 8, preferably 2 to 4, active hydrogen atoms. Suitable alkylene oxides include 1,2- or 2,3-butylene oxide, and preferably, ethylene oxide and propylene oxide. The alkylene oxides can be used individually, alternatingly in sequence or in mixtures. Tetrahydrofuran, styrene oxide, and oxetane may also be used. Possible starter molecules are: water, dicarboxylic acids such as succinic acid, adipic acid, phthalic acid and terephthalic acid, N-mono-, N,N- and N,N'-dialkyl substituted diamines having 1 to 4 carbon atoms in the alkyl radical and mono- and dialkyl substituted such as ethylene diamine, propylene diamine, 1,3-propanediamine, 1,4-butanediamine, 1,6-hexamethylenediamine and 4,4'-, 2,4'- and 2,2'-diaminodiphenyl methane, alkanolamines such as ethanolamine, diethanolamine, N-methyl- and N-ethyl-diethanolamine, and triethanolamine, and hydrazine. Preferably employed as starter molecules are ethylene glycol, propylene glycol, diethylene glycol, dipropylene glycol, 1,4-butanediol, 1,6-hexanediol, glycerine, trimethylolpropane, pentaerythritol, sorbitol and sucrose.

Preferably used are primarily the di- and/or particularly the trifunctional polyethers having molecular weights of 200 1 to 8000, preferably of 800 to 6000, hydroxyl numbers of 145 to 800, preferably of 25 to 200, and which contain ethylene oxide as well as propylene oxide units in the oxyalkylene chain and which can be arranged randomly or in block form in the oxyalkylene chain.

Most preferred are polyethers which contain primary hydroxyl groups and particularly trifunctional polyethers with hydroxyl numbers from 20 to 40.

The organic or inorganic fillers which may be employed in this invention, are basically the known common organic and inorganic fillers, reinforcing agents, weighting agents, agents for improving the abrasion resistance in paints, coating materials, etc. For example, inorganic fillers such as silicate materials of the type of sedimentation silicates such as antigorite, serpentine, hornblende, amphibole, chrisotile, talc; metal oxides such as kaolin, aluminum oxide, titanium oxide and iron oxide; metal salts such as chalk, heavy spar, and inorganic pigments such as cadmium sulfide, zinc sulfide as well as glass, asbestos meal and other materials. Preferably used are kaolin (China clay), aluminum silicate and coprecipitates of barium sulfate and aluminum silicate. Possible organic fillers include coal, melamine, kollophonium and cyclopentadienyl resins. The organic and inorganic fillers may be used individually or in mixtures.

For the manufacture of the polyol-filler dispersions according to this invention, dispersing auxiliaries may also be used if required in quantities of 0.1 to 10 percent by weight, preferably of 0.5 to 5 percent by weight, based on the weight of the filler. These include dispersing auxiliaries such as oleic amides, esters of higher fatty acids such as mono-, di- and triglycerides of oleic acid, and oxyethylated fatty acids among others.

As previously mentioned, it is of primary importance, for the manufacture of stable dispersions according to this invention, that the filler materials are crushed with high localized energy densities to particle sizes of less than 7 microns in situ in the polyols particularly particle sizes ranging from 0.01 to 5 microns, preferably 0.05 to 1.5 microns.

High local energy densities in the sense of this invention are energy densities of 10 to 3000 kilowatt hours per cubic meter, preferably 20 to 1000 kilowatt hours per cubic meter. This corresponds with related outputs per volume-power unit of approximately 100 to 2500 kilowatts per cubic meter.

The following examples are provided to further illustrate the invention. All parts are by weight unless otherwise designated.

EXAMPLE 1

To 500 parts of a product manufactured by the reaction of barium sulfate with silicic acid (a calcining loss of 6 percent by weight, SiO content 73 percent, and $BaSO_4$ content 21 percent, pH value according to DIIN-53200=7.0) and having an average particle size of 70 microns was stirred into 200 parts of a polyether manufactured by reacting glycerine with propylene oxide and ethylene oxide having a molecular weight of 4900 and a hydroxyl number of 35. This mixture was crushed in a ball mill for four hours, the internal wall of which was rubber lined and with glass balls being used as the grinding material.

The rotational speed of the ball mill was selected in such a manner that the local energy density was approximately 2000 to 2500 kilowatt hours per cubic meter and that a temperature of 35° C. in the dispersions was not exceeded during the dispersion time. Following this, the dispersion was removed from the mill and a sedimentation analysis was carried out. It was determined that 95 percent of the particles contained in the dispersion were smaller than 1 micron and 50 percent of the particles were smaller than 0.5 micron. After 3 months, the storage-stable dispersion did not show any sedimentation whatsoever.

EXAMPLE 2

To 480 parts of a kaolin having a pH value of 5.5 and a specific weight of 3.6 grams per cubic centimeter, wherein 99.5 percent by weight of the particles were smaller than 10 microns and 80 percent by weight of the particles were smaller than 2 microns, was added 1800 parts of a polyether produced by reacting trimethylolpropane with propylene oxide and ethylene oxide having a molecular weighty of 5000 and a hydroxyl number of 32. This mixture was passed five times through a continuously operating ball mill. The overall grinding process took 3 hours. The local energy density was approximately 2000 to 2500 kilowatt hours per cubic meter. A sedimentation analysis of the resulting dispersion showed that less than 1 percent by weight of the particles had a size greater than 3 microns, approximately 80 percent by weight of the particles were approximately 1 micron in size, and 20 percent by weight of the particles were less than 0.5 micron. After 4 months, the dispersion did not show any sedimentation.

EXAMPLE 3

To 200 parts of a commercially available talc powder containing 62.6 percent by weight of $SiO_2$, 31.4 percent by weight of $MgO$, 0.20 percent by weight of $Al_2O_3$, 4.8 percent by weight of water, having a density of 2.77 grams per cubic centimeter, 99 percent of which had grain sizes smaller than 10 microns, and 85 percent had grain sizes smaller than 5 microns, was added 800 parts of a polyether prepared by reacting trimethylolpropane with propylene oxide and ethylene oxide, having a molecular weight of 4900 and a hydroxyl number of 35. The mixture was crushed in a continuously operating ball mill with glass balls as grinding material (ball diameter 3 millimeters) in 5 passes at 40° C. The grinding process required 4 hours. The local energy density was approximately 600 kilowatt hours per cubic meter. A sedimentation analysis of the resulting dispersion showed that 99 percent by weight of the particles were smaller than 4 microns.

EXAMPLES 4–9 AND COMPARATIVE EXAMPLES A–E

Inorganic fillers mixed with a polyether prepared by reacting trimethylolpropane with propylene oxide and ethylene oxide having a molecular weight of 4900 and a hydroxyl number of 35 were crushed in a bead mill (manufacturer: Drais) with a local energy density of 600 kilowatt hours per cubic meter.

For the comparative examples, the filler was stirred in with the aid of a rotating disc mixer (rpm 1500) and the mixture was subsequently agitated for 30 minutes. The applied fillers concentrations in the polyether are based on the overall weight. The grinding duration and viscosities obtained are summarized in the following Table.

TABLE

| Example | Comparative Example | Filler | Filler Concentration in the Polyether % by Weight | Grinding Duration hrs. | Viscosity at 25° C. m Pa . s | Sediment after 21 days |
|---|---|---|---|---|---|---|
| 4 |   | ®Traumafill (manufacturer: Degussa) | 10 | 3 | 1300 | no sediment |
|   | A | ®Traumafill (manufacturer: Degussa) | 10 | — | 1500 at bottom | solid precipitate |
| 5 |   | ®Traumafill (manufacturer: Degussa) | 15 | 16 | 2500 | no sediment |
|   | B | ®Traumafill (manufacturer: Degussa) | 15 | — | 2250 at bottom | solid precipitate |
| 6. |   | Aluminum silicate P820 (manufacturer: Degussa) | 10 | 3 | 1240 at bottom easily mixable | slight precipitate |
| 7 |   | Aluminum silicate P820 (manufacturer: Degussa) | 10 | 48 | 1500 | no sediment |
|   | C | Aluminum silicate P820 (manufacturer: Degussa) | 10 | — | 1400 bottom compact | precipitate at |
| 8 |   | China clay (English clay group) | 20 | 6 | 4000 at bottom | slight precipitate |
|   | D | China clay (English clay group) | 20 | — | 2250 bottom | precipitate at |
| 9 |   | Talcum IT extra (Norwegian talc) | 20 | 6 | 3800 sediment | little loose |
|   | E | Talcum IT extra (Norwegian talc) | 20 | — | 4500 bottom | solid sediment at |

EXAMPLE 10

To 250 parts of a coprecipitate consisting of barium sulfate and silicic acid ($BaSO_4$ content 21 percent and $SiO_2$ content 73 percent) with an average particle size of 70 microns, was added 1000 parts of a polyester polyol manufactured by poly-condensation of adipic acid and a diol mixture consisting of 1,4-butanediol, 1,5-pentanediol and 1,6-hexanediol with an OH number of 56 and a viscosity of 650 m.Pa.s measured at 75° C.

After one hour of intensive mixing and grinding in a dissolver, a milky dispersion was obtained which did not form any sediment after having been stored for 6 months. The particle size of the dispersion was 7 microns maximum; 93 percent of the particles were smaller than 5 microns and 78 percent of the particles were smaller than 3 microns.

EXAMPLES 11–12

Duplicating the procedure in Example 3 but replacing the commercially available talc powder with coal dust or a dicyclopentadienyl resin, storage stable dispersions were also obtained wherein 99 percent of the particles were smaller than 4 microns.

The embodiments of the invention in which an exclusive property or privilege is claimed are defined as follows:

1. A process for the manufacture of stable polyol filler dispersions wherein the fillers in polyols are crushed with high localized energy densities in situ to particle sizes of less than 7 microns.

2. The process of claim 1 wherein the localized energy densitites are 10 to 3000 kilowatt hours per cubic meter.

3. The process of claim 1 wherein the polyols have molecular weights of 200 to 8000 and hydroxyl numbers of 20 to 600.

4. The process of claim 1 wherein polyethers having molecular weights of 800 to 6000 are used as polyols.

5. The process of claim 1 wherein inorganic fillers are used as filler materials.

* * * * *